J. S. LAFLEUR.
NUT LOCK.
APPLICATION FILED SEPT. 22, 1909.

960,349.

Patented June 7, 1910.

Witnesses

Inventor
Jean S. Lafleur.
By E. E. Vrooman
his Attorney

UNITED STATES PATENT OFFICE.

JEAN SINIA LAFLEUR, OF OPELOUSAS, LOUISIANA.

NUT-LOCK.

960,349.  Specification of Letters Patent.  Patented June 7, 1910.

Application filed September 22, 1909. Serial No. 518,894.

*To all whom it may concern:*

Be it known that I, JEAN SINIA LAFLEUR, a citizen of the United States, residing at Opelousas, in the parish of St. Landry and State of Louisiana, have invented certain new and useful Improvements in Nut-Locks, of which the following is a specification, reference being had therein to the accompanying drawing.

This invention relates to nut-locks, and the principal object of the same is to provide thread-gripping means which are carried by the nut and adapted to tightly grip the threads of the bolt so that normally said bolt and nut cannot be relatively rotated.

The invention also contemplates means whereby the thread gripper may be manually released from the bolt when necessary or desirable to separate the bolt and nut.

In carrying out the objects of the invention, generally stated above, it will be understood, of course, that the essential features thereof are necessarily susceptible of changes in details and structural arrangement, one preferred and practical embodiment of which is shown in the accompanying drawing, wherein—

Figure 1:
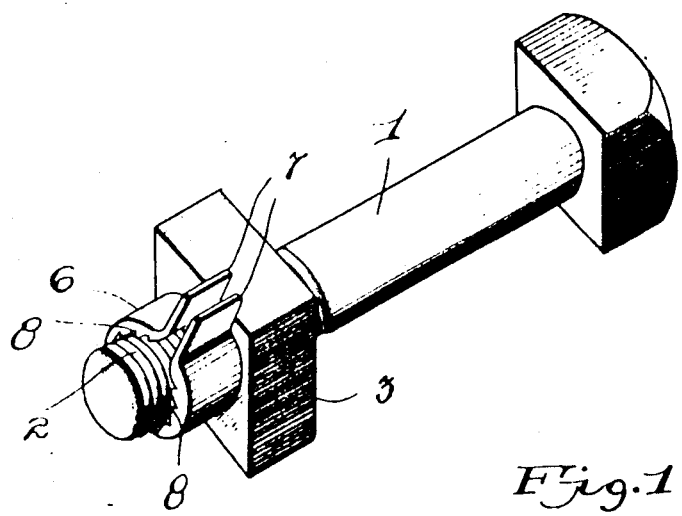
Figure 2:
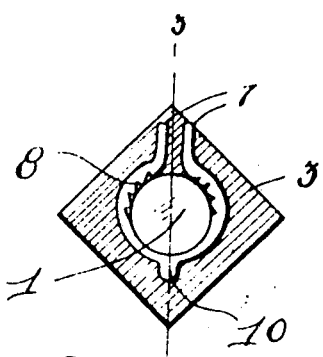
Figure 4:
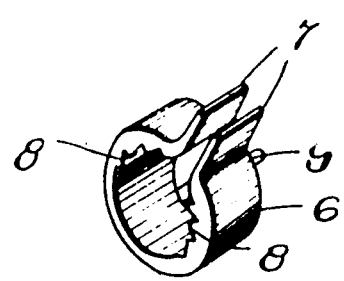
Figure 3:
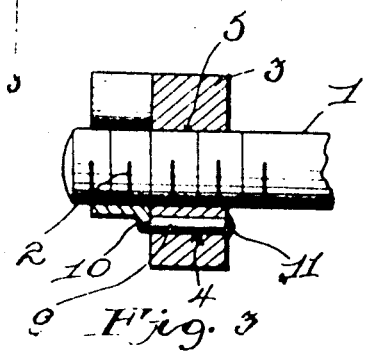

Figure 1 is a perspective view showing a bolt and nut held in locked relation by the improved locking device. Fig. 2 is an end view thereof. Fig. 3 is a central vertical sectional view taken on the line 3—3, Fig. 2. Fig. 4 is a detail perspective view of the improved locking device.

Referring to said drawings by numerals, 1 designates a bolt provided with the usual threaded portion 2, and 3 designates a nut adapted for engagement with said threads, said nut being provided with a fastener opening 4, adjacent its central opening or bore 5.

The improved threaded gripping locking device is formed of spring metal bent to form a tubular body portion 6 the ears 7 thereof being bent outwardly from said body and arranged in parallel spaced relation. Interiorly, said body is provided with teeth or serrations 8. At the rear of said body a pin 9 projects outwardly from one of the edges thereof, said pin being provided with an offset portion 10, and being of a length to permit it to be passed through the opening 4 of the nut 3, and its free end headed or riveted as indicated at 11 so that said body will be held in locked relation with the nut.

In applying the nut to the bolt, the parallel end ears 7 of the body are forced apart by means of a suitable tool inserted between the same so that the body 6 will be expanded to clear the threads of the bolt 1. When the nut has been tightened upon the bolt, the tool is removed from between the said ears, whereupon the body will spring into binding relation with the bolt and cause its teeth or serrations 8 to bite into the threads of the bolt. To release the nut, the body is expanded as described above.

It will be seen from the foregoing that the improved locking device may be attached to any nut by simply boring a hole through the same for the passage of the pin 9, after which said pin may be locked within said opening by upsetting the free end of said pin.

Preferably, the pin 9 is integral with said body, although it will be obvious that, if desired, the same may be separate, but rigidly fastened thereto.

What I claim is:

1. In a device of the character described, the combination with a bolt, of a nut and a releasable tubular body permanently secured to said nut, and formed with longitudinal teeth on its inner surface adapted to bite into the threads of the nut, and having a pair of laterally projecting ears parallel to and in close proximity to each other and adapted to be forced apart by a tool in order to release the tubular body from the bolt and permit the said body and nut to be removed from the bolt.

2. In a device of the character described, the combination with a bolt, of a nut having a hole extending through the nut transversely, and a releasable tubular body having a pin projecting from its inner edge and extending through said hole in the nut, and permanently secured thereto, said tubular body having longitudinal teeth on its inner surface adapted to bite the threads of the bolt and also having a pair of laterally projecting ears in close proximity to each other and adapted to be forced apart by
5 a tool in order to release the tubular body from the bolt and permit the withdrawal of the nut.

In testimony whereof I hereunto affix my signature in presence of two witnesses.

JEAN SINIA LAFLEUR.

Witnesses:
TILGHMAN G. CHACHERE, Jr.,
YOURICK LEDOU.